(No Model.)
H. KILLAM.
CARRIAGE AXLE.
No. 315,299. Patented Apr. 7, 1885.
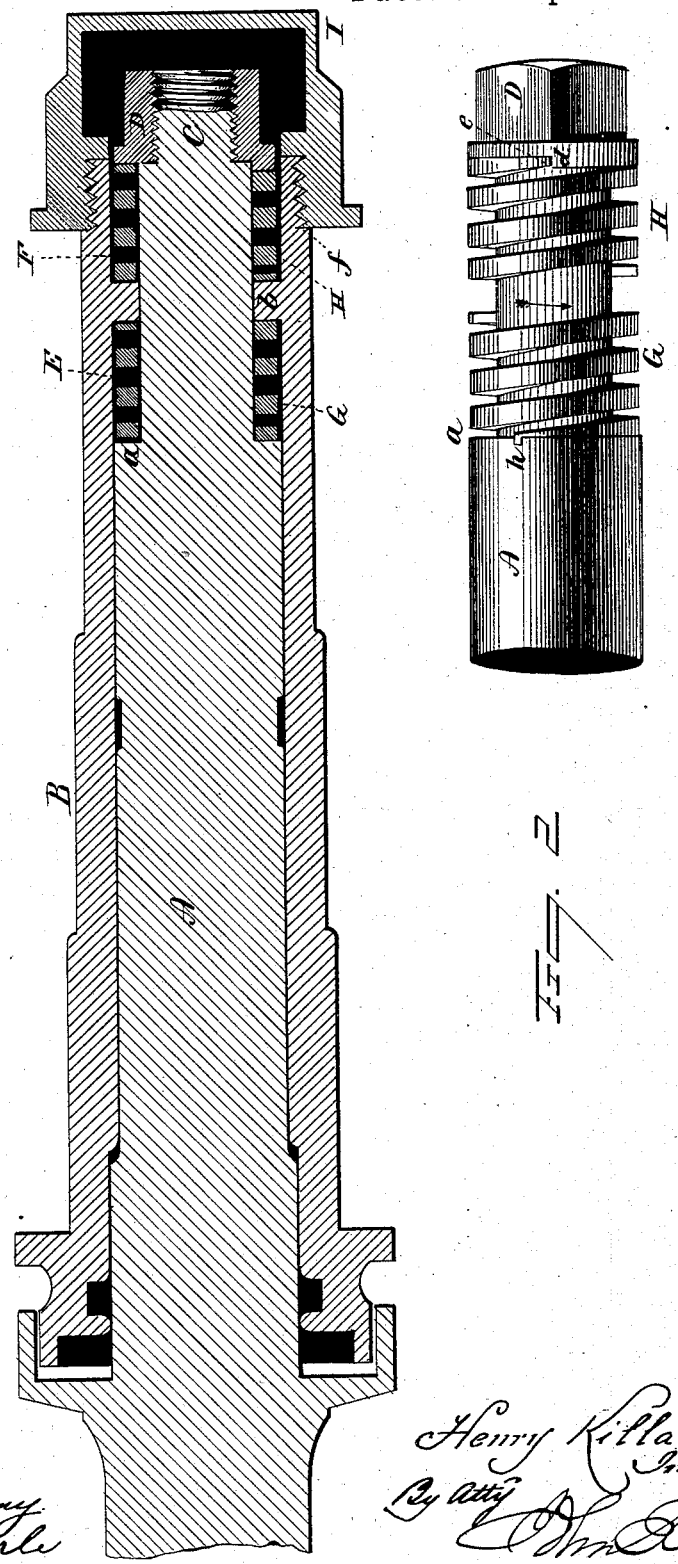

UNITED STATES PATENT OFFICE.

HENRY KILLAM, OF NEW HAVEN, CONNECTICUT.

CARRIAGE-AXLE.

SPECIFICATION forming part of Letters Patent No. 315,299, dated April 7, 1885.

Application filed December 8, 1884. (No model.)

*To all whom it may concern:*

Be it known that I, HENRY KILLAM, of New Haven, in the county of New Haven and State of Connecticut, have invented a new Improvement in Carriage-Axles; and I do hereby declare the following, when taken in connection with accompanying drawings and the letters of reference marked thereon, to be a full, clear, and exact description of the same, and which said drawings constitute part of this specification, and represent, in—

Figure 1, a longitudinal central section of the arm with the box applied; Fig. 2, a side view of the outer portion of the axle-arm, showing the spring and nut, the axle-box removed.

This invention relates to an improvement in that class of carriage-axles in which a spring or springs are arranged between the axle-arm and box, the arms and box being provided with shoulders, against which the said springs operate, and so as to take the longitudinal thrust upon the wheel, whether it be outward or inward. In some cases as heretofore constructed a single spring has been applied to the outer end of the axle-arm, its two ends taking a bearing both on a shoulder in the box and on a shoulder in the axle-arm, so that the single spring would take the thrust in both the outward and inward direction—such, for illustration, as the patent granted to me August 12, 1879, No. 218,443. In other constructions a spring has been arranged at the extreme inner end of the axle, and a second spring at the extreme outer end, the box or axle arm being recessed accordingly, and so that one spring will operate to take the thrust in one direction and the other spring to take the thrust in the opposite direction.

In other applications of two springs they have been arranged one upon the axle at its forward end to bear against the outer end of the box, a nut applied to the end of the axle to bear against the outer end of that one spring, then a second spring applied to bear against the said nut, and a second nut applied over the second spring and first nut, the said second nut screwed onto the box. It is the latter or two-spring class of axles to which my invention particularly relates, the object of the invention being, first, to locate the two springs at the outer end of the axle-arm and within the box, and in such manner that they are interchangeable, the one with the other—that is, so that all the springs for the axles of a carriage will be duplicates one of another; and, second, to prevent the surplus oil or lubricating material from working to the inner end of the axle-arm and out to waste at the inner end of the hub; and the invention consists, first, in reducing the axle-arm from the outer end inward, and so as to form a shoulder at the rear of the reduced portion, and arranging two helical springs upon the said reduced portion, the external diameter of the springs being substantially that of the axle-arm, combined with the box constructed to fit the axle-arm and over the springs, with an annular inwardly-projecting flange at the reduced portion of the arm, and so as to stand between the two springs, with a nut on the outer end of the axle-arm, which will bear against the spring without contact with the box; and, second, in arranging the outer helical spring with its coil toward the nut, and in the direction of revolution of the wheel, and providing a stop to prevent the revolution of the spring on the axle-arm, whereby the groove between the convolutions of the spring is inclined outward toward the nut, and form a channel, to cause the flow of oil or lubricating material under the action of the revolving wheel to tend toward the outer end of the axle-arm and into the oil-cap on the end of the box, as more fully hereinafter described.

A represents the axle-arm, and B the box, which, except as to their outer end, are of common construction. At the outer end, and for a distance therefrom, the axle-arm is reduced in diameter, the reduction being equal to the thickness of the wire of the springs to be applied, and so as to form a shoulder, *a*, at the rear of the reduced portion. At the outer end the axle-arm is further reduced to form the screw C, and upon this screw a nut, D, is applied to bear against the shoulder on the axle-arm. The internal diameter of the box continues substantially uniform to its outer end, thereby leaving a space between the reduced portion of the axle-arm and the interior of the box.

At a point about midway of the length of the reduced portion the interior of the box is constructed with an inwardly-projecting annular flange, b, dividing the space on the reduced portion of the arm to form two spring-chambers, E and F, F being the outer chamber.

G is a helical spring, preferably made from square wire, which in thickness is slightly less than the width of the chambers between the axle-arm and the box. It is first set onto the axle-arm against the shoulder a, and is in length about one-half the length of the reduced portion of the axle-arm.

H is a helical spring, duplicate of the spring G, and is applied to the axle-arm in like manner. After the first spring, G, has been set against the shoulder a on the axle-arm, the wheel, to which the box is applied in the usual manner, is set upon the axle-arm to bring the inner side of the flange b against the outer end of the spring, as seen in Fig. 1. Then the second spring, H, is introduced around the axle-arm and into the outer chamber, F, against the outer side of the flange b. The nut D then being applied comes to a bearing against the spring, as seen in Fig. 1, and thereby holds the flange b in suspension between the two springs, and so that any thrust upon the wheel inward will be taken up by the spring G, or a like thrust outward will be taken up by the spring F, these springs yielding as a cushion to such thrust. The convolutions of the two springs are alike, and are outward in the direction of the revolution of the wheel, as seen in Fig. 2, the arrow indicating the direction of revolution of the wheel.

To prevent the revolution of the spring H under the friction which may come upon it by contact with the box, I construct the flange of the nut with a shoulder, d, against which the outer end, e, of the spring takes a bearing, it being understood that the thread of the screw is in the direction of the revolution of the wheel. Over the nut or outer end of the axle the oil-cap I is set. This cap is chambered upon its inside to receive the lubricant. It is internally screw-threaded, as at f, to fit a corresponding screw-thread on the outside of the outer end of the box. The lubricant is introduced into the cap, and the cap then screwed onto a bearing against the end of the box, as seen in Fig. 1, and so that as the wheel revolves the nut stands substantially within the oil-chamber.

In the revolution of a carriage-wheel upon its axle the natural tendency of the oil is to work toward the larger or inner end of the axle, and there will escape to waste through the opening which is necessary at that end for the proper play of the wheel upon the axle. To prevent such tendency of the oil the spring H is arranged with its coil outward, in the direction of the revolution of the wheel. The convolutions of the spring leave a space between them, which forms a spiral channel outward toward the oil-box and in the direction of the revolution of the wheel. The oil following the surface of the box onto the axle-arm will be met by the convolutions of the spring, and, following the box, the action of the convolutions is to take the oil from the interior of the box into the outwardly-inclined spiral channel and cause it to work around the axle in that direction through the channel to return to the oil-chamber; but the fit of the spring in the box is not perfect, so that while it returns the surplus oil to the oil-cup it permits sufficient oil to run onto the axle-arm for lubricating purposes.

By making the two springs G H duplicates there is no liability to misplacement of the springs when the wheel is removed from the carriage or in assembling the parts at the manufactory.

While I prefer to make the stop for the outer spring only, it may be applied also to the inner spring—say as by cutting a notch, h, in the axle and turning the inner end of the inner spring into that notch; or the inner spring only may be thus held and the outer spring left free.

The application of the two springs at the outer end of the axle makes a construction of the arm and box much simpler then where one spring is applied to the outer end and the other to the inner end, and thereby reduces the cost of manufacture to a very considerable extent.

The arrangement of the helical spring around the axle-arm with its convolutions outward and in the direction of the revolution of the wheel, with a stop to prevent the revolution of the spring with the wheel, may be applied at any point along the axle-arm, with the same tendency to return the oil toward the outer end of the arm, as hereinbefore described. I therefore do not wish to be understood as limiting this part of my invention to the particular construction and arrangement of spring herein described.

I claim—

1. The combination of an axle-arm reduced at its outer end to form a shoulder, a, the axle-box fitted to the axle-arm, and constructed with an internal annular flange, b, about midway of the length of the said reduced portion at the forward end of the axle, and so as to form two independent chambers, E F, around the axle-arm at the outer end, a helical spring, G, arranged in the inner chamber, and so that its inner end takes its bearing against said shoulder on the axle-arm, and its outer end against the inner side of said flange, a second spring, H, arranged in said chamber F, its inner end taking its bearing against the outside of said flange b, and its outer end upon the nut D on the outer end of the axle, and bearing against the outer end of said spring H, substantially as described.

2. The combination of an axle-arm reduced at its outer end, the helical spring around said reduced portion of the axle, the convolutions of which are outward and forward in the direction of revolution of the wheel, a box arranged upon said axle-arm, and with a shoulder to take a bearing against the inner end of said spring, a nut fixed at the outer end of the axle-arm, and so as to bear against the outer end or convolution of said spring, a stop against which the said spring will bear, to prevent its forward revolution with the wheel, with an oil-cap fitted to the box over the nut, substantially as described.

3. The combination of an axle arm reduced at its forward end, and so as to form a shoulder, $a$, around the arm, the box B, constructed to fit the axle-arm, and with an internal annular flange, $b$, midway of the length of said reduced portion of the arm, and so as to form a chamber, E, between the shoulder on the arm and the inner side of said flange, and a second chamber, F, upon the outer side of said flange, a helical spring, G, arranged in said inner chamber, E, and a like helical spring arranged in said outer chamber, F, a nut upon the end of the axle-arm, so as to bear against the outer end or convolution of the spring in the outer chamber, the convolutions of the said springs being outward and forward in the direction of the revolution of the wheel, and a stop to prevent the revolution of either of said springs with the wheel, with an oil-cap over the nut and fixed to the box, substantially as described.

HENRY KILLAM.

Witnesses:
JOHN E. EARLE,
JOS. C. EARLE.